(12) United States Patent
Jitsukawa et al.

(10) Patent No.: US 10,523,298 B2
(45) Date of Patent: Dec. 31, 2019

(54) METHOD FOR CONTROLLING WIRELESS COMMUNICATION, WIRELESS COMMUNICATION SYSTEM, RECEPTION DEVICE, AND TRANSMISSION DEVICE

(71) Applicant: FUJITSU LIMITED, Kawasaki-shi, Kanagawa (JP)

(72) Inventors: Daisuke Jitsukawa, Adachi (JP); Takashi Dateki, Yokohama (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/835,611

(22) Filed: Dec. 8, 2017

(65) Prior Publication Data

US 2018/0102824 A1 Apr. 12, 2018

Related U.S. Application Data

(63) Continuation of application No. PCT/JP2015/003147, filed on Jun. 23, 2015.

(51) Int. Cl.
*H04B 7/06* (2006.01)
*H04L 25/02* (2006.01)
*H04W 72/04* (2009.01)

(52) U.S. Cl.
CPC .......... *H04B 7/0634* (2013.01); *H04B 7/0617* (2013.01); *H04L 25/0204* (2013.01); *H04L 25/0224* (2013.01); *H04W 72/0413* (2013.01)

(58) Field of Classification Search
CPC .. H04B 7/0617; H04B 7/0413; H04B 7/0626; H04B 7/0634; H04L 25/0204

(Continued)

(56) References Cited

U.S. PATENT DOCUMENTS 8,446,317 B1 * 5/2013 Wu ...................... H01Q 3/2605
342/368
2002/0058479 A1 5/2002 Voyer
(Continued)

FOREIGN PATENT DOCUMENTS

JP 2002-186050 A 6/2002
JP 2007-74189 A 3/2007
(Continued)

OTHER PUBLICATIONS

Huawei et al., "Discussion on SRS enhancement for EBF/FD-MIMO", Agenda Item: 7.2.5.2.1, 3GPP TSG-RAN WG1 Meeting #80bis, R1-151283, Belgrade, Serbia, Apr. 20-24, 2015.
(Continued)

*Primary Examiner* — Emmanuel Bayard
(74) *Attorney, Agent, or Firm* — Myers Wolin, LLC.

(57) ABSTRACT

A method performed by a transmission device and a reception device in a wireless communication system, the method including: executing a process for receiving a reference signal, which is transmitted from each of plural transmit antennas of the transmission device, through a specific receive antenna which is one of at least one receive antenna of the reception device; executing a process for deciding a transmit antenna weight and a receive antenna weight based on the reference signal, the transmit antenna weight and the receive antenna weight being applied in a case where only the specific receive antenna receives a signal which is transmitted by each of the plural transmit antennas based on same transmission data; and executing a process for transmitting first information about the transmit antenna weight and second information about the receive antenna weight to the transmission device.

12 Claims, 9 Drawing Sheets

(58) Field of Classification Search
USPC .................................. 375/267, 299, 347–349
See application file for complete search history.

(56) References Cited

U.S. PATENT DOCUMENTS

| | | |
|---|---|---|
| 2011/0150052 A1 | 6/2011 | Erell et al. |
| 2012/0071199 A1* | 3/2012 | Yamazaki ............ H04B 7/0417 |
| | | 455/524 |
| 2012/0099470 A1 | 4/2012 | Li et al. |
| 2013/0022143 A1* | 1/2013 | Ko ...................... H04L 27/2601 |
| | | 375/267 |
| 2014/0254578 A1 | 9/2014 | Yamaura |
| 2014/0286298 A1* | 9/2014 | Yoshimoto ............ H04B 7/024 |
| | | 370/329 |
| 2015/0270609 A1* | 9/2015 | Jin .......................... G01S 13/90 |
| | | 342/372 |
| 2015/0295631 A1* | 10/2015 | Yoshimoto ............ H04B 7/024 |
| | | 370/329 |
| 2015/0349870 A1* | 12/2015 | Chen .................... H04B 7/0822 |
| | | 375/347 |
| 2017/0311217 A1* | 10/2017 | Jung ...................... H04W 36/04 |
| 2017/0311301 A1* | 10/2017 | Yu ........................ H04B 7/0617 |

FOREIGN PATENT DOCUMENTS

| | | |
|---|---|---|
| JP | 2012-531129 A | 12/2012 |
| JP | 2013-514703 A | 4/2013 |
| JP | 2013-168751 A | 8/2013 |
| JP | 2014-135529 A | 7/2014 |
| KR | 2008-0110959 A | 12/2008 |
| KR | 2013-0011294 A | 1/2013 |
| WO | 2007/126036 A1 | 11/2007 |

OTHER PUBLICATIONS

Takano et al., "Transmit and Receive Weighting Method for Vector Coding in the Presence of Channel Estimation Error and Feedback Delay", IEICE Technical Report. RCS, Radio Communication Systems, 110(369), Jan. 13, 2011, pp. 245-250, with English abstract, cited in ISR.
International Search Report issued for corresponding International Patent Application No. PCT/JP2015/003147, dated Nov. 24, 2015, with an English translation.
Extended European search report with supplementary European search report and the European search opinion issued by the European Patent Office for corresponding European Patent Application No. 15896253.0, dated Jun. 4, 2018.
First Notification of Office Action issued by the State Intellectual Property Office of China for corresponding Chinese Patent Application No. 201580081087.2, dated Aug. 27, 2018, with an English translation.
Notice of Reasons for Refusal issued by the Japanese Patent Office for corresponding Japanese Patent Application No. 2017-524146, dated May 28, 2019 with a machine-generated English translation.
Notice of Preliminary Rejection issued for corresponding Korean Patent Application No. 10-2017-7036674, dated Oct. 4, 2019, with full English translation attached.

* cited by examiner

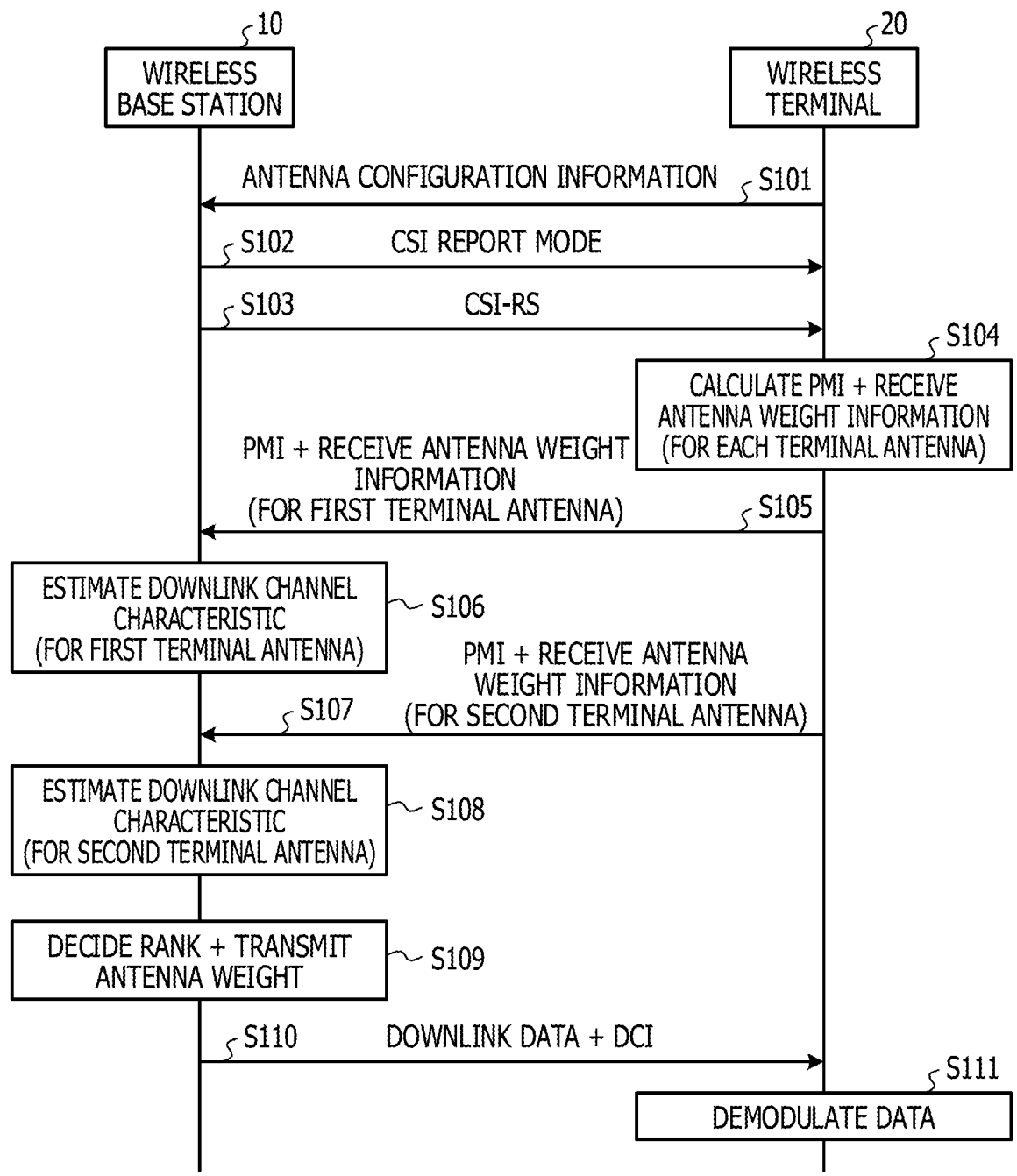

METHOD FOR CONTROLLING WIRELESS COMMUNICATION, WIRELESS COMMUNICATION SYSTEM, RECEPTION DEVICE, AND TRANSMISSION DEVICE

CROSS-REFERENCE TO RELATED APPLICATION

This application is a continuation application of International Application PCT/JP2015/003147 filed on Jun. 23, 2015 and designated the U.S., the entire contents of which are incorporated herein by reference.

FIELD

The present invention relates to a method for controlling wireless communication, a wireless communication system, a reception device, and a transmission device.

BACKGROUND

In recent years, for wireless communication systems such as cellular phone systems (cellular systems), next generation wireless communication techniques have been discussed in order to, for example, further increase the speed of wireless communication and enlarge the capacity of wireless communication. For example, 3rd Generation Partnership Project (3GPP), which is a standards organization, has suggested a communication standard, which is referred to as Long Term Evolution (LTE) and a communication standard, which is referred to as LTE-Advanced (LTE-A) that is based on wireless communication techniques of LTE. In the following, unless otherwise mentioned, "LTE" includes LTE and LTE-A and in addition other wireless communication systems in which those are expanded.

In the wireless communication system based on LTE, a transmission scheme which uses multiple antennas is specified. Such a transmission scheme is generally categorized into three of multiple input multiple output (MIMO), multiple input single output (MISO), and single input multiple output (SIMO). MIMO is correspondent to a case where each of a transmission device and a reception device uses plural antennas. As one example of MIMO, a case where the transmission device includes four transmit antennas and the reception device includes two receive antennas is generally expressed as "4×2 MIMO". Meanwhile, MISO is correspondent to a case where only the transmission device uses plural antennas, and SIMO is correspondent to a case where only the reception device uses plural antennas.

Those multi-antenna techniques use properties in which the transmission-reception situation of wireless signals largely changes due to only a little difference in the positions of the antennas. Thus, in the multi-antenna techniques, plural communication paths (generally referred to as multi-path) are formed between the transmission device and the reception device. In one example, in a case of 4×2 MIMO, 4×2=8 communication paths are formed, and multipath communication by those eight communication paths may be realized. In such multipath communication, plural communication paths are utilized, and wireless communication are thereby simultaneously (in parallel) executed by using the same frequency band. Consequently, by the multi-antenna technique, various effects may be obtained, which may not be obtained by wireless communication by a single transmit-receive antenna. For example, use of a limited wireless resource enables an improvement in the capacity (throughput) of wireless communication and expansion of the coverage.

Thus, also in 3GPP, researches and developments that are related to the multi-antenna techniques have been actively conducted. The newest specification of LTE supports a maximum of eight antennas for a wireless base station (evolved node B: eNB) and supports a maximum of four antennas for a wireless terminal (user equipment: UE). It may be expected that the number of usable antennas will further increase in the future in order to intend a further improvement in the throughput or the like.

Incidentally, in LTE, scheduling of wireless communication is in principle performed by the wireless base station. Here, the scheduling of wireless communication is allocation of wireless resources (frequencies and time) for performing wireless communication in a narrow sense but includes a variation of settings and designation of parameters for performing wireless communication in a broad sense. For example, selection of modulation and coding schemes that are used for wireless communication, selection of whether or not MIMO is performed, and so forth are portions of the scheduling, and those are performed by the wireless base station in LTE.

In order to schedule efficient wireless communication, the wireless base station has to recognize the state of a wireless communication path (channel) that is formed between the wireless base station itself and the wireless terminal. For example, in a case where the channel state is comparatively good, high-rate modulation and coding schemes are selected, and the throughput of wireless communication may thereby be enhanced. On the other hand, in a case where the channel state is comparatively bad, low-rate modulation and coding schemes are selected, and the accuracy of wireless communication may thereby be secured. In such a manner, in efficient wireless communication, it may be said that recognition of the channel state by the wireless base station is a premise.

By the way, wireless communication is generally performed bidirectionally between the wireless base station and the wireless terminal. The direction from the wireless terminal to the wireless base station is referred to as uplink, and the direction from the wireless base station to the wireless terminal is referred to as downlink.

Here, because the wireless base station serves as the reception device in uplink wireless communication, the wireless base station itself may measure the uplink channel state based on the reception signal. However, because the wireless base station serves as the transmission device in downlink wireless communication, the wireless base station itself may not measure the downlink channel state.

Accordingly, in LTE, uplink feedback information to the wireless base station based on the downlink channel state measured by the wireless terminal is defined. Those pieces of feedback information are referred to as channel state information (CSI). The CSI enables the wireless base station to recognize the downlink channel state to some extent, and the wireless base station is capable of performing adequate scheduling even in the downlink wireless communication.

Note that there are the CSI that notifies information which is decided based on the downlink channel quality and the CSI that notifies information which is decided based on the downlink channel characteristic. Here, although there are several indices that indicate the channel quality, representative indices are a signal interference noise ratio (SINR) and so forth. On the other hand, the channel characteristic is a characteristic itself of the channel and is specifically the change in the phase and amplitude of the wireless signal provided by the channel. In general, in a case of M×N MIMO, the channel characteristic is expressed by an M×N complex matrix (channel matrix).

SUMMARY

According to an aspect of the invention, a method for controlling wireless communication is performed in a wireless communication system that has a transmission device which includes plural transmit antennas and a reception device which includes at least one receive antenna. The method includes: executing, by the reception device, a reception process that includes receiving a reference signal through a specific receive antenna which is one of the at least one receive antenna, the reference signal being transmitted from each of the plural transmit antennas; executing, by the reception device, a decision process that includes deciding a transmit antenna weight and a receive antenna weight based on the reference signal, the transmit antenna weight and the receive antenna weight being applied in a case where only the specific receive antenna receives a signal which is transmitted by each of the plural transmit antennas based on same transmission data; and executing, by the reception device, a transmission process that includes transmitting first information about the transmit antenna weight and second information about the receive antenna weight to the transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 (i.e.

FIG. 2 (i.e.

FIG. 3 is a diagram that illustrates a process sequence of a wireless communication system according to a second embodiment.

DESCRIPTION OF EMBODIMENTS

Figure 1A:
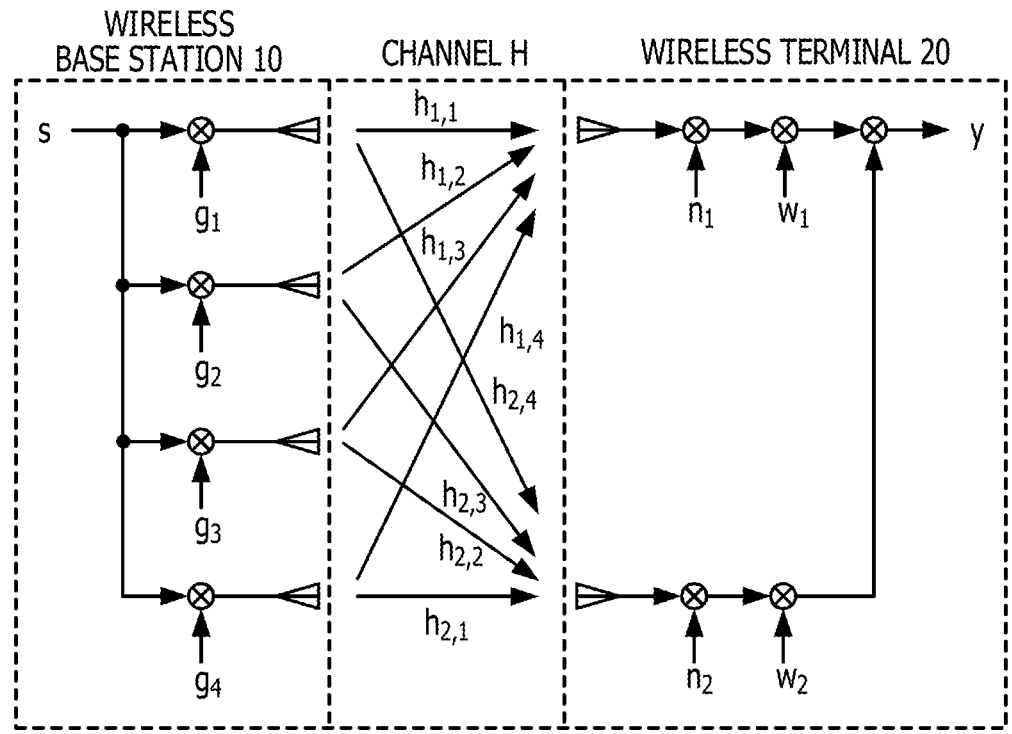
FIGS. 1A and 1B) is a diagram that explains the location of a problem in this application.

As described above, CSI that is prearranged uplink feedback information in LTE enables a wireless base station to recognize the downlink channel state to some extent. However, the inventor of this application considers that sufficiency of CSI is debatable.

That is, as described earlier, there are the CSI that notifies information which is decided based on the downlink channel quality and the CSI that notifies information which is decided based on the downlink channel characteristic. However, neither piece of CSI reports the downlink channel characteristic itself. Thus, in a situation in which the wireless base station desires to recognize the downlink channel characteristic itself, it is considered that CSI is possibly not necessarily sufficient. As a result, using only CSI may lead to trouble to realization of efficient wireless communication in a prescribed situation.

Particularly, as a result of study by the inventor of this application, as described later, it has been found that CSI is not sufficient in a case where multipath communication that uses plural transmit antennas is performed (MIMO or MISO).

Although the above description has been made based on LTE, it is noted that the above description applies to other wireless communication systems in a case where prescribed conditions are satisfied.

The techniques of the disclosure has been made in consideration of the above, and an object is to provide a method for controlling wireless communication, a wireless communication system, a reception device, and a transmission device in which a wireless base station may sufficiently recognize a downlink channel characteristic in a case where multipath communication is performed by using plural transmit antennas.

A description will hereinafter be made with reference to drawings about embodiments of a method for controlling wireless communication, a wireless communication system, a reception device, and a transmission device of the disclosure. Note that although embodiments are described on the assumption that they are separate embodiments for convenience of description, it is matter of course that effects by combination are obtained by combining the embodiments and usefulness may thereby be further enhanced.

[Location of Problem]

First, before describing the embodiments, the location of a problem in related art will be described. It will be noticed that this problem has newly been found as a result of detailed study of related art by the inventor and has not been known in related art.

As described above, CSI that is prearranged uplink feedback information in LTE does not report the downlink channel characteristic itself in any case. Thus, in a situation in which the wireless base station desires to recognize the downlink channel characteristic itself, it is considered that CSI is possibly not necessarily sufficient.

Accordingly, first, an outline of CSI that is the prearranged uplink feedback information in LTE will be reviewed. In LTE, as CSI, pieces of feedback information such as channel quality indicator (CQI), precoding matrix indicator (PMI), and rank indicator (RI) are defined.

The CQI is feedback information that indicates the downlink channel quality. A wireless terminal measures the downlink channel quality (such as a SINR) based on a reference signal or the like that is transmitted from the wireless base station, decides the CQI based on the measurement result, and feeds back the CQI to the wireless base station. The CQI is feedback information of 6 bits, and there are the CQI that targets a wideband and the CQI that targets a subband. The wireless base station uses the CQI fed back from the wireless terminal to perform a decision or the like of the coding rate or the modulation scheme, which is used for downlink data transmission. Thus, the feedback of the CQI is performed in a similar manner regardless of whether the number of transmit antennas on the wireless base station side is singular or plural.

The PMI is feedback information that indicates the transmit antenna weight in downlink multipath communication based on plural transmit antennas. The wireless terminal estimates the downlink channel characteristic based on the reference signal or the like that is transmitted from the wireless base station and calculates an adequate transmit antenna weight (and receive antenna weight) based on the estimation result. Then, the wireless terminal decides the PMI based on the calculated transmit antenna weight and feeds back the PMI to the wireless base station. The wireless base station multiplies the transmission signal of each antenna by a different weight based on the fed-back transmit antenna weight and thereafter performs transmission (generally referred to as precoding). The transmit antenna weight is used, and effects of enhancing the gain of a reception signal and so forth may thereby be obtained. The transmit antenna weight is generally expressible by a matrix of the number of transmit antennas× the number of streams (described later) and may thus be referred to as precoding matrix.

In LTE, the transmit antenna weight itself is not fed back, but the PMI as the index value of the transmit antenna weight is fed back based on a codebook. Although depending on the rank (described later), the PMI is feedback information of 2 or 4 bits. The PMI is correspondent to feedback information in a case where the setting of the transmit antenna weight is set based on a closed-loop scheme. Here, the closed-loop scheme is a scheme that has the feedback information from the wireless terminal to the wireless base station as a premise. Note that in LTE, it is possible to set the transmit antenna weight based on an open-loop scheme that does not have the feedback information from the wireless terminal to the wireless base station as a premise.

The RI is feedback information that indicates the rank in downlink multipath communication based on plural transmit antennas. Here, rank is a term in LTE and is correspondent to the number of layers in the multipath communication that uses plural transmit antennas. Further, layer here is also a term in LTE and indicates a concept that is generally referred to as stream. Here, stream is a concept that has a meaning of a unit of an information sequence (signal sequence) that is transmitted and received.

The wireless terminal measures the downlink channel quality based on the reference signal or the like that is transmitted from the wireless base station, decides the RI based on the measurement result, and feeds back the RI to the wireless base station. The RI is feedback information of a maximum of 3 bits. For example, in a case where wireless communication of a rank of 2 is performed in 2×2 MIMO, each of two layers (streams) is transmitted and received via two transmit-receive antennas. This is generally referred to as spatial multiplexing and is performed to raise the throughput in a case where the channel quality is good or the like. Meanwhile, in a case of a rank of 1, one layer (stream) is transmitted and received via two transmit-receive antennas. This is generally referred to as spatial diversity and is performed to raise the certainty in a case where the channel quality is bad or the like or to give a directivity for a transmission signal (beamforming). Note that in the newest specification of LTE, the maximum value of rank is 8.

As reviewed above, CSI that is prearranged feedback information in LTE does not report the downlink channel characteristic itself in any case. Thus, in LTE, it is not simple for the wireless base station to recognize the downlink channel characteristic itself. However, in related art, even in a case where the wireless base station may not recognize the downlink channel characteristic itself, considerable inconvenience does not occur.

However, in the future, it is anticipated that a situation occurs in which the wireless base station desires to recognize the downlink channel characteristic itself. In the following, as one example, a discussion will be made about a case where coordinate beamforming as one type of coordinated multipoint (CoMP) is performed. It is noted that a similar problem may occur in a case where multiuser MIMO is performed, for example.

It is assumed that a certain wireless base station now receives feedback of the RI indicating rank 2 and the PMI corresponding thereto from a certain wireless terminal in accordance with the prearranged specification of LTE. Meanwhile, it is assumed that before or after the reception, the concerned wireless base station receives a request for the coordinated beamforming from another wireless base station that is a cooperative station. Further, it is assumed that the concerned wireless base station gives priority to the request from the cooperative station and that in order to suppress an interference with wireless terminals under the cooperative station, the concerned wireless base station desires to perform the beamforming of rank 1 (directional communication) instead of performing the multipath communication of rank 2 to the concerned wireless terminal.

Here, the PMI that indicates the transmit antenna weight is in general a totally different value in accordance with the rank. Thus, in the above situation, the wireless base station recognizes the PMI of rank 2 but may not recognize the PMI of rank 1. Accordingly, in order for the wireless base station to perform the beamforming of rank 1, the wireless terminal is caused to again send the PMI that corresponds to rank 1. However, this case leads to a problem that it becomes difficult to perform wireless communication at an appropriate timing due to the delay caused by performance of repeated feedback. Further, because the first feedback signal is substantially wasted, this also leads to a problem of loss of wireless resources. Accordingly, it is considered that it is difficult for only the prearranged CSI of LTE to appropriately handle the above-described situation.

Differently, it is assumed that the wireless base station may recognize the downlink channel characteristic itself. In this case, the wireless base station may obtain by itself the PMIs of all ranks based on the recognized channel characteristics. Thus, the problems such as the delay and loss of wireless resources because of repeated feedback do not occur as the method based on the prearranged CSI of LTE, which is described earlier. Accordingly, it is considered that the wireless base station may recognize the channel characteristic and may thereby appropriately handle the above-described situation.

In such a manner, in the future, it is anticipated that a situation occurs in which the wireless base station desires to recognize the downlink channel characteristic itself. It is considered that such situations progressively increase in the future in response to the increase in wireless terminals and wireless base stations.

Incidentally, in LTE, a frequency division duplex (FDD) scheme and a time division duplex (TDD) scheme are defined. Between those, in the FDD scheme, different frequency bands are used in the uplink and downlink, and the channel characteristics are totally different between the uplink and downlink. Thus, it is basically difficult for the wireless base station to estimate by itself the downlink channel characteristic.

Differently, in the TDD scheme, the wireless base station may basically estimate by itself the downlink channel characteristic. Specifically, first, the wireless base station may estimate by itself the uplink channel characteristic based on the signal received by the wireless base station itself. Then, in the TDD scheme, because the same frequency band is used between the uplink and the downlink, the downlink channel characteristic becomes equivalent to the uplink channel characteristic. Thus, in the TDD scheme, although the wireless base station itself is the transmission device, the wireless base station may estimate by itself even the downlink channel characteristic.

However, in LTE, because of the specification, the number of the transmit antennas of the uplink wireless terminal side may be restricted. For example, in the specification of LTE, even if the wireless terminal includes four antennas, only one or two of the antennas may be used as the transmit antennas (four of those may be used as the receive antennas). Thus, even in a case of the TDD scheme, it may be said that the downlink channel characteristics that may be recognized by the wireless base station are a portion and it is difficult to recognize all the downlink channel characteristics.

Accordingly, in LTE, not only in the FDD scheme but also in the TDD scheme, the wireless base station may not sufficiently recognize by itself the downlink channel characteristic. That is, it is noted that the problem of the invention of this application concerns not only the FDD scheme but also the TDD scheme of LTE.

By the way, based on the necessity of recognition of the downlink channel characteristic itself by the wireless base station, which is discussed above, a specific method for the wireless base station to recognize the downlink channel characteristic itself will continue to be discussed.

First, as the simplest method, it is possible to feed back the downlink channel characteristic itself that is estimated by the wireless terminal to the wireless base station without any change. Consequently, although it is natural, the wireless base station is enabled to recognize the downlink channel characteristic.

However, it is considered that two problems are present in this feedback method.

First, this feedback method has a problem that a change from the prearranged specification is large. In the first place, in the prearranged specification of LTE, a content that indicates feedback of the downlink channel characteristic does not exist at all. Thus, in realization of this feedback method, it is difficult to make use of the prearranged specification, and a new specification of the feedback method itself has to be made from scratch. In addition, in a case where the feedback of the channel characteristic itself is realized, employing a codebook scheme as for the PMI is realistic. However, a specification of this codebook has to be made from scratch also. Actually, in general, changes of the specification may not be avoided in a case where a new function is added. However, in a case where the amount of change is large, the amount of change may be a barrier to introduction of the concerned function. It is considered that because the above-described feedback method requests a too large amount of change of the specification, introduction is difficult.

Further, as another problem of a method for feeding back the downlink channel characteristic itself, a size of the feedback information is raised. For example, in a case of 8×4 MIMO, in a case where an attempt is made to send the characteristics (changes in phases and amplitudes) themselves of 32 channels, even if one channel characteristic is quantized by 13 bits (6 bits for amplitude and 7 bits for phase), the size of feedback information reaches 32×13=416 bits. Meanwhile, means such as decreasing the number of bits for one channel and employing the codebook scheme as for the PMI are possible. However, excessive quantization degrades the precision of the channel characteristic that may be obtained by the wireless base station, and the priorities may be confused.

Based on those problems, it is considered that the method for feeding back the downlink channel characteristic itself is not realistic.

Differently, if the wireless base station may obtain the downlink channel characteristic by using the aforementioned PMI, it is thought that those problems are solved.

That is, because the PMI is the prearranged feedback signal in LTE, if the wireless base station recognizes the downlink channel characteristic by using the PMI, a change from the prearranged specification is not requested at all. Further, because the PMI is information of 2 or 4 bits, it is considered that there is not a problem of the size of the feedback information.

Thus, a discussion will be made about whether it is possible for the wireless base station to obtain the downlink channel characteristic based on the PMI. If this is possible, the conclusion may be that it is desirable to make use of the existing PMI as the feedback information by which the wireless base station recognizes the downlink channel characteristic.

Here, the PMI will be described again. As aforementioned, the PMI is feedback information that indicates the transmit antenna weight (precoding) in downlink multipath communication based on plural transmit antennas. The wireless terminal estimates the downlink channel characteristic based on the reference signal or the like that is transmitted from the wireless base station and calculates an adequate transmit antenna weight and receive antenna weight based on the estimation result. Then, the wireless terminal decides the PMI based on the calculated transmit antenna weight and feeds back the PMI to the wireless base station.

Here, in order to make a further description about the PMI, a description will be made about an outline of processes of the transmission device and the reception device in multipath communication.

As one example, FIG. 1A illustrates a schematic diagram of the multipath communication in a case where 4×2 MIMO is used and the rank (the number of streams) is 1. Here, the transmission device is a wireless base station 10, and the reception device is a "wireless terminal 20. Further, s denotes a transmission signal, gi denotes a transmit antenna weight, hi,j denotes components of a channel matrix H, nj denotes thermal noise and interference with each receive antenna, wj denotes a receive antenna weight, and y denotes a composite signal in the reception device (where $1 \leq i \leq 4$, $1 \leq j \leq 2$).

As illustrated in FIG. 1A, in the wireless base station 10, one transmission signal generated based on one stream s is multiplied by each of four transmit antenna weights gm, four signals (for convenience of description, those will be referred to as weighted transmission signals) are thereby generated, and those signals are respectively transmitted from four transmit antennas. Those four weighted transmission signals are further multiplied by the components hi,j of the channel characteristic that forms the 4×2 multipath, are composited in a space, and are received by two receive antennas as reception signals. In addition, in the wireless terminal 20, thermal noise and interference nj are added to the two respective reception signals, the two reception signals are further multiplied by different receive antenna weights wj, and two signals (for convenience of description, those will be referred to as weighted reception signals) are generated. Finally, two weighted reception signals are composited, and y as the final composite signal at a time before the stream is demodulated and decoded is obtained.

In FIG. 1A, in a case where the wireless terminal 20 decides a transmit antenna weight gi and the receive antenna weight wj from the channel characteristic, the decision is made such that the gain of a composite signal y becomes the maximum in a case where a minimum mean square error (MMSE) method or the like, which is a representative demodulation method in multipath communication, is used as a premise. Focusing on phase components, this corresponds to a fact that the phases of the weighted reception signals that are the signals at a time immediately before composition are aligned. This is because the gain of the composite signal y is maximized as a result of the weighted reception signals strengthening each other because of the alignment of phases.

Based on FIG. 1A, a discussion will be made about whether the wireless base station 10 may obtain the channel characteristic H based on the PMI. Here, although a discussion will be made while the phases of the components hi,j of the channel characteristic H are focused, it is noted that the amplitudes of the components of H may also be considered similarly.

First, the PMI is not the transmit antenna weight gi itself in FIG. 1A but is an index value that indicates the transmit antenna weight. Thus, ideally, the obtainment of the PMI by the wireless base station 10 may be assumed to be equivalent to the obtainment of the transmit antenna weight (because the PMI is the transmit antenna weight that is quantized, lowering in precision may fairly occurs of course).

Here, in a case where the wireless base station 10 receives the feedback of the PMI (transmit antenna weight gi), even taking into consideration a premise that the phases of the two weighted reception signals in FIG. 1A are aligned, it is understood that the phases of the components hi,j of the channel characteristic H illustrated in FIG. 1A may not be estimated based on the PMI. As illustrated in FIG. 1A, this is due to a fact that the receive antenna weight wj somehow has to be taken into consideration in order to obtain H.

Figure 1B:
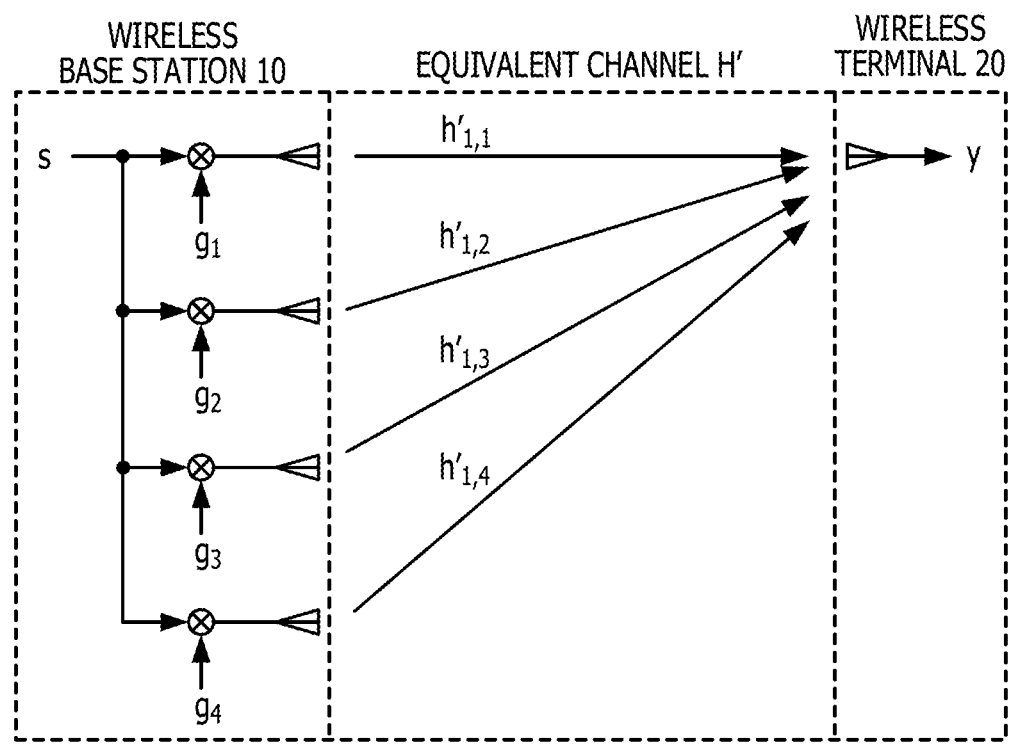

Differently, for reference, FIG. 1B illustrates a schematic diagram in which the case that corresponds to FIG. 1A is expressed by an equivalent channel. In FIG. 1B, the components hi,j of the channel H, the thermal noise and interference nj, and the receive antenna weight wj are associated with a virtual equivalent channel (MMSE equivalent channel) H' (the components are h'i,j). In FIG. 1B, in a case where the wireless base station 10 receives the feedback of the PMI (transmit antenna weight gi), taking into consideration a premise that the phases of the four reception signals are aligned (in this case, the gain on the reception side becomes the maximum), it is understood that the phase components of a characteristic H' of the equivalent channel illustrated in FIG. 1 may be estimated based on the PMI. That is, the wireless base station 10 may obtain the phase components of the characteristic H' of the equivalent channel as the opposite phase to the phase of the transmit antenna weight indicated by the PMI (note that the thermal noise and interference nj are random number values and are thus not taken into consideration for simplicity). However, as described earlier, the channel characteristic H in FIG. 1A that is actually demanded may not be obtained in such a simple manner.

From the above discussion, it is understood that the wireless base station 10 may not obtain the downlink channel characteristic based only on the PMI. Accordingly, new feedback information is requested by which the wireless base station 10 obtains the downlink channel characteristic.

Concluding the above, it is expected that situations in which the wireless base station 10 desires to recognize the channel characteristic in the downlink multipath communication will increase in the future. However, in LTE, in either case of the FDD scheme and the TDD scheme, the reality is that the wireless base station 10 may not sufficiently recognize by itself the channel characteristic itself in the downlink multipath communication. To handle this, it is possible that the channel characteristic itself in the downlink multipath communication that is estimated by the wireless terminal 20 is fed back to the wireless base station 10. However, this is not realistic when the largeness of the requested changes in the specification and the size of the feedback information are taken into consideration. Meanwhile, only the PMI that is prearranged feedback information in LTE may not enable the wireless base station 10 to sufficiently recognize the channel characteristic in the downlink multipath communication.

Although the above description has been made based on LTE, it is noted that the above description applies to other wireless communication systems in a case where prescribed conditions are satisfied.

In the following, the embodiments that solve this problem will be sequentially described.

[First Embodiment]

A first embodiment will hereinafter be described based on FIG. 1. As illustrated in FIG. 1, the first embodiment is a control method in a wireless communication system that includes a transmission device which includes plural transmit antennas and a reception device which includes at least one receive antenna, in which the reception device receives a reference signal transmitted from each of the plural transmit antennas by a specific receive antenna that is one of the at least one receive antenna, the reception device decides a transmit antenna weight and a receive antenna weight based on the reference signal, the transmit antenna weight and the receive antenna weight being applied in a case where only the specific receive antenna receives a signal that is transmitted by each of the plural transmit antennas based on the same transmission data, and the reception device transmits first information about the transmit antenna weight and second information about the receive antenna weight to the transmission device.

A technical significance of the first embodiment will be described. As described above, for example, even in a case where the PMI or the like that is the prearranged feedback information in LTE is used without any change, the wireless base station 10 may not recognize the channel characteristic of the multipath in the downlink. As described earlier, this is due to a fact that the PMI is only a weight on the transmission side in the multipath communication in the downlink.

Accordingly, the inventor of this application has considered that if the wireless base station 10 may obtain both of the transmit antenna weight (for example, the PMI) and the receive antenna weight that corresponds thereto, there is a possibility that the channel characteristic of the multipath in the downlink may be estimated based on the transmit antenna weight and the receive antenna weight. Actually, because there is no means by which the wireless base station 10 obtains the receive antenna weight in the present LTE, such estimation may not be realized. However, if the wireless base station 10 may receive the prearranged transmit antenna weight (for example, the PMI) and in addition feedback of any information about the receive antenna weight that corresponds to the transmit antenna weight, it is considered that the downlink channel estimation by the wireless base station 10 becomes realistic. This point is the first focus of the inventor of this application.

However, even in a case where the information about the receive antenna weight is fed back, because many specific schemes exist, desirable schemes have to be studied among those. Here, in evaluating the feedback scheme, it is considered that the above-described three viewpoints are desirably comprehensively taken into consideration. That is, it is considered that a feedback scheme is desirable which may estimate the channel characteristic in the downlink multipath based on the feedback information in the first place, which requests small changes to the prearranged specification in the second place, and which uses a small size of feedback information in the third place.

Based on the above, in the first embodiment, the feedback of the information about the receive antenna weight is performed as follows.

First, the wireless terminal 20 obtains the transmit antenna weight and the receive antenna weight in a case where one receive antenna selected from at least one receive antenna in the wireless terminal 20 (for convenience of description, this antenna will be referred to as specific antenna) is used and where the same transmission data are transmitted from all the plural transmit antennas in the wireless base station 10. In other words, the wireless terminal 20 obtains the transmit antenna weight and the receive antenna weight in a case where M×1 (so-called MISO) downlink multipath communication is performed and the number of streams (rank) is 1. The wireless terminal 20 may obtain such transmit antenna weight and receive antenna weight based on a prescribed base signal (reference signal, pilot signal, or the like) that is included in a reception signal which is, in a space, composited with transmission signals transmitted from the plural antennas in the wireless base station 10 and which is received by the specific antenna.

Then, the wireless terminal 20 transmits the feedback information to the wireless base station 10 based on the obtained weights. Here, the wireless terminal 20 according to this embodiment also feeds back information about the receive antenna weight in addition to information about the transmit antenna weight to the wireless base station 10.

Here, as the information about the transmit antenna weight, the information may be used in which the transmit antenna weight is quantized, for example. As a specific example of the information about the transmit antenna weight, the PMI that is the prearranged feedback information of LTE may be raised, for example.

Meanwhile, the information about the receive antenna weight may be information in which the receive antenna weight is quantized, for example. Here, quantization for the receive antenna may be performed separately for phase components and amplitude components or may be performed for those together. Further, it is possible to use an index value based on the codebook as the information about the receive antenna weight. Anyway, in view of the size of the feedback information, as the information about the receive antenna weight, it is desirable to use not the receive antenna weight itself but the information whose size is shrunk by quantization or the like.

By the way, in a case where plural receive antennas in the wireless terminal 20 are present, the wireless terminal 20 in the embodiment of this application switches the specific antenna that is selected from the plural receive antennas as appropriate and performs similar feedback. As one example, here, a case of 4×4 MIMO will be discussed (the receive antennas on the wireless terminal 20 side are set as first to fourth receive antennas). In this case, the wireless terminal 20 first selects the first antenna as the specific antenna, for example, obtains the transmit antenna weight and the receive antenna weight in a case of 4×1 downlink transmission, and feeds back those to the wireless base station 10. Next, the wireless terminal 20 selects the second antenna as the specific antenna, for example, obtains the transmit antenna weight and the receive antenna weight in a case of 4×1 downlink transmission, and feeds back those to the wireless base station 10. A similar process is performed for the two remaining receive antennas.

Note that although every receive antenna is selected as the specific antenna in this example, there may be the receive antenna that is not selected as the specific antenna. For example, in a case of the TDD, for the antenna that is usable as the transmit antenna in the wireless terminal 20, the wireless base station 10 may estimate by itself the downlink channel characteristic. Thus, the antenna may not be selected as the specific antenna. Further, in this case, although the feedback is individually (four separate times) performed for each specific antenna, it is matter of course that appropriate and collective feedback for the antennas is possible.

The above is the procedures of the feedback scheme in the first embodiment. In the following, this scheme will continue to be discussed based on the aforementioned three viewpoints.

First, based on the feedback information, it is checked that the wireless base station 10 may perform channel estimation of the multipath in the downlink. As described above, the feedback information in the first embodiment is the information about the transmit antenna weight and the receive antenna weight in a case where M×1 downlink multipath communication is performed and the number of streams is 1.

Figure 2A:
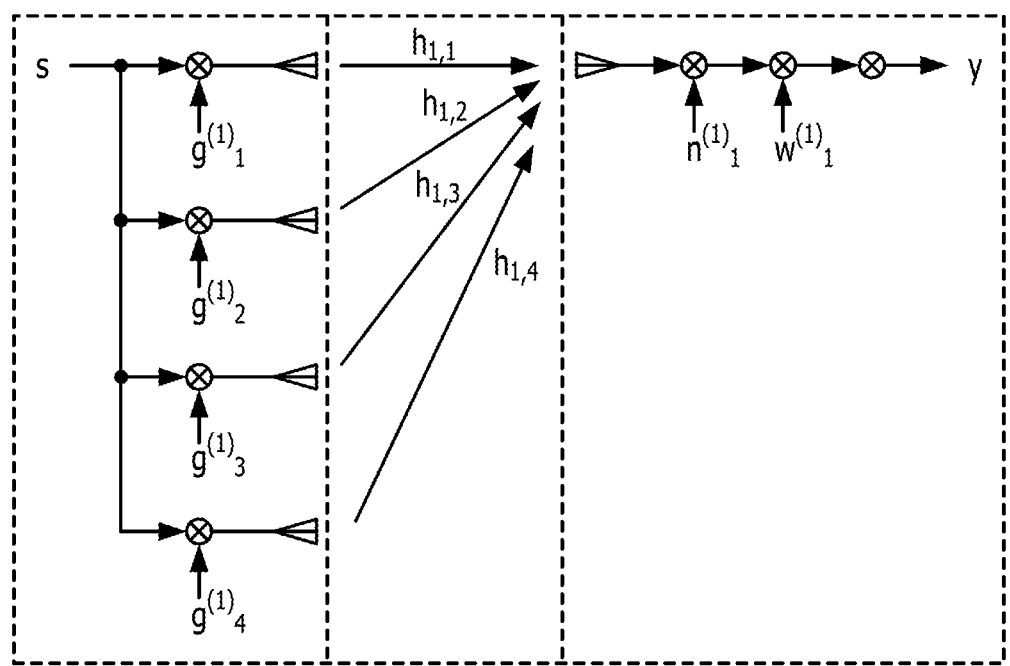
FIGS. 2A and 2B) is a diagram that explains a first embodiment.
Figure 2B:
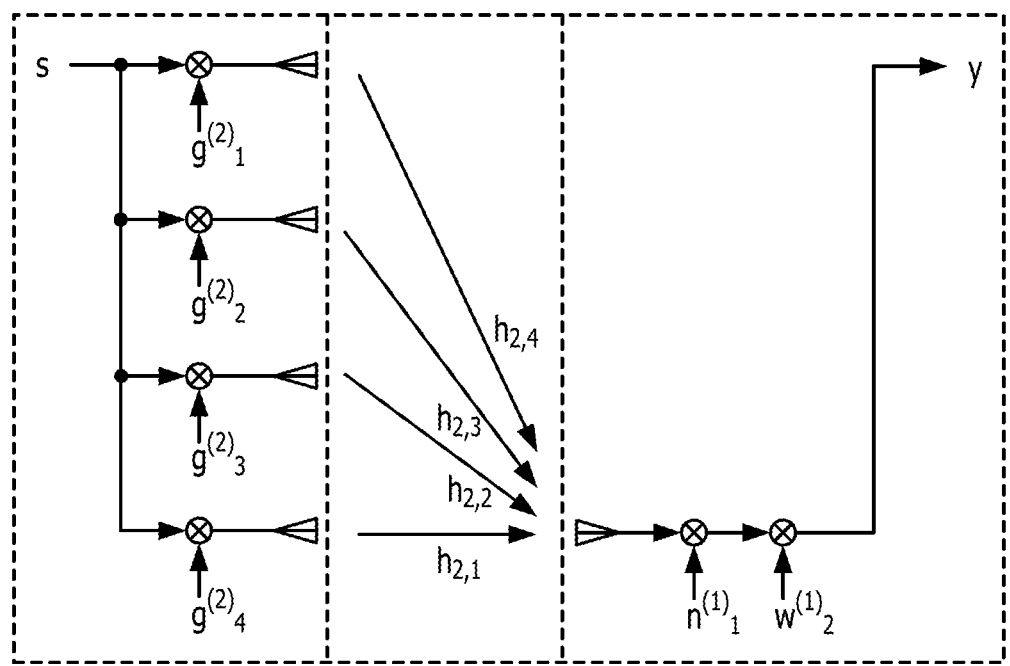

FIG. 2A and FIG. 2B are schematic diagrams of the 4×1 downlink multipath communication whose number of streams is 1, as one example. Symbols in FIG. 2A and FIG. 2B are similar to FIG. 1A except superscript numerals for identification for convenience, and a detailed description will thus not be made here.

Here, FIG. 2A and FIG. 2B illustrate 4×2 MIMO multipath communication (channel characteristic H) that are divided into 4×1 multipath communication for every two receive antennas. FIG. 2A illustrates 4×1 multipath communication (channel characteristic H(1)) that corresponds to a case where the specific receive antenna is the first receive antenna, and FIG. 2B illustrates 4×1 multipath communication (channel characteristic H(2)) that corresponds to a case where the specific receive antenna is the second receive antenna. In general, the downlink channel characteristic in a case of M×N MIMO may be decomposed into N M×1 (MISO) channel characteristics.

Now, based on FIG. 2A, a discussion will be made about whether the wireless base station 10 may obtain the channel characteristic H(1) based on the PMI. Here, although a discussion will be made while the phases of the components of the channel characteristic H(1) are focused, it is noted that the amplitudes of the components of H(1) may also be considered similarly.

First, in a case where the wireless terminal 20 decides a transmit antenna weight g(1)i and a receive antenna weight w(1)j from the channel characteristic in FIG. 2A, the decision is made such that the gain of the composite signal y becomes the maximum in a case where the MMSE method or the like is used as a premise similarly to FIG. 1A. Focusing on phase components, this corresponds to a fact that the phases of the weighted reception signals that are the signals at a time immediately before composition are aligned. Note that in FIG. 2A, this is equivalent to a fact that the phases of the reception signals that reach the wireless terminal 20 are aligned.

Further, the fed back information about the transmit antenna weight is not the transmit antenna weight g(1)i itself in FIG. 2A but is information that is obtained by quantization or the like of the transmit antenna weight. Thus, ideally, the obtainment of the information about the transmit antenna weight by the wireless base station 10 may be assumed to be equivalent to the obtainment of the transmit antenna weight (lowering in precision may fairly occurs of course). As for this point, the same applies to the information about the receive antenna weight.

Now, it is assumed that the wireless base station 10 receives the feedback of the information about the transmit antenna weight and the information about the receive antenna weight in a case where the specific antenna is the first receive antenna. In this case, it is understood that the phases of the components of the channel characteristic H(1) illustrated in FIG. 2A may be estimated based on those pieces of information. That is, as aforementioned, in FIG. 2A, there is a premise that the phases of the reception signals that reach the wireless terminal 20 are aligned. Based on the premise, it is understood that the wireless base station 10 may obtain the phase of the components of the channel characteristic H(1) as the opposite phase to the sum of the phases of the transmit antenna weight g(1)i and the receive antenna weight w(1)j (note that the thermal noise and interference n(1)j are random number values and are thus not taken into consideration for simplicity).

In such a manner, the wireless base station 10 according to this embodiment may estimate the channel characteristic H(1) in the 4×1 multipath communication that corresponds to a case where the specific receive antenna is the first receive antenna, which is illustrated in FIG. 2A.

Further, as aforementioned, in this embodiment, in a case where plural receive antennas in the wireless terminal 20 are present, the wireless terminal 20 switches the specific antenna that is selected from the plural receive antennas as appropriate and performs similar feedback. Thus, the wireless base station 10 receives the feedback of the information about the transmit antenna weight and the information about the receive antenna weight in a case where the specific antenna is the second receive antenna. Accordingly, the channel characteristic H(2) in FIG. 2B may also be obtained similarly to the channel characteristic H(1) in FIG. 2A.

Eventually, the channel characteristics H(1) and H(2) that are individually obtained are combined, and the wireless base station 10 according to this embodiment may thereby obtain the desired channel characteristic H.

In such a manner, in this embodiment, the wireless terminal 20 feeds back the information about the receive antenna weight in addition to the information about the transmit antenna weight. Thus, the wireless base station 10 is enabled to estimate the channel characteristic in the downlink multipath based on those pieces of information. Accordingly, the feedback method according to this embodiment does not have a problem in the aforementioned first viewpoint.

Note that the above description that is made based on mathematical formulas will be as follows. For example, in above-described FIG. 1A, the signal y may be expressed by the following formula (1).

$$y = W^H(H \cdot G \cdot s + n) \tag{1}$$

In this case, the SINR of the signal y may be expressed by the following formula (2). Here, $P_s$ represents transmission power, and $\sigma 2$ represents interference noise power.

$$\text{SIN } R = |W^H \cdot H \cdot G \cdot s|^2 / |W^H \cdot n|^2 = |(W^H \cdot H)G|^2 P_s / \sigma^2 \tag{2}$$

In addition, an optimal transmission weight Gopt for the wireless terminal 20 may be expressed by the following formula (3).

$$G_{opt} = \arg\max_G \log[1 + \text{SINR}] = \arg\max_G \left(|(W^H \cdot H)G|^2\right) = \frac{(W^H \cdot H)^H}{|(W^H \cdot H)^H|} \tag{3}$$

Here, the optimal transmission weight Gopt ideally approximates a precoding vector GPMI based on the PMI. Thus, the following formula (4) is derived from the formula (3).

$$\frac{W^H \cdot H}{|W^H \cdot H|} = G_{opt}^H \cong G_{PMI}^H = [g_1^* \; g_2^* \; g_3^* \; g_4^*]^T \tag{4}$$

Meanwhile, in a case where the first antenna of at least one receive antenna in the wireless terminal 20 is set as the specific antenna, for example, based on a premise that the rank is fixed to 1 (correspondent to the 4×1 multipath communication that corresponds to FIG. 2A), the following formula (5) holds.

$$\frac{w_1[h_{1,1} \; h_{1,2} \; h_{1,3} \; h_{1,4}]}{|W^H \cdot H|} = [g_1^* \; g_2^* \; g_3^* \; g_4^*]^T \tag{5}$$

Here, the 4×1 multipath channel characteristic that corresponds to FIG. 2A may be expressed by the following formula (6). Note that the amplitude component and the phase component of |WH·H|/w1 are represented as Aamp and Aphase, respectively.

$$h_{1,1} = g_1^* \cdot |W^H \cdot H|/w_1 = g_1^* \cdot A_{amp} \cdot \exp(j \cdot A_{phase})$$

$$h_{1,2} = g_2^* \cdot |W^H \cdot H|/w_1 = g_2^* \cdot A_{amp} \cdot \exp(j \cdot A_{phase})$$

$$h_{1,3} = g_3^* \cdot |W^H \cdot H|/w_3 = g_3^* \cdot A_{amp} \cdot \exp(j \cdot A_{phase})$$

$$h_{1,4} = g_4^* \cdot |W^H \cdot H|/w_4 = g_4^* \cdot A_{amp} \cdot \exp(j \cdot A_{phase}) \tag{6}$$

In the formula (6), if the wireless terminal 20 feeds back Aamp and Aphase in addition to GPMI =[g1 g2 g3 g4] to the wireless base station 10, it is understood that the wireless base station 10 may obtain the 4×1 multipath channel characteristic. Accordingly, as one example, the combination of Aamp and Aphase may be employed as the aforementioned "information about the receive antenna weight".

Next, the feedback method according to this embodiment will be discussed in the aforementioned second viewpoint, that is, whether the changes to the prearranged specification are small. As aforementioned, if the method for feeding back the channel characteristic itself is employed, the channel characteristic itself has to be specified as new feedback information. This is not very desirable because the change of the specification is large. On the other hand, because a method for feeding back the receive antenna weight and the transmit antenna weight as in this embodiment may make use of the prearranged feedback information without any change as the transmit antenna weight (for example, the PMI in LTE). Thus, the feedback information that has to be newly added may be only the information about the receive antenna weight. Accordingly, it is considered that this method has advantages of requesting small changes to the existing specification and of easy introduction.

Finally, the feedback method according to this embodiment will be discussed in the aforementioned third viewpoint, that is, whether the size of the feedback information is small. As described earlier, if the method for feeding back the channel characteristic itself is employed, the channel characteristic itself has to be transmitted as new feedback information. On the other hand, because the method for feeding back the transmit antenna weight and the receive antenna weight may make use of the prearranged feedback information without any change as the transmit antenna weight. Thus, only the information about the receive antenna weight is sufficient as the feedback information that is added. Thus, comparing both of the methods, it is considered that the method for feeding back the transmit antenna weight and the receive antenna weight requests a lower degree of the increase in the feedback information from the existing specification.

More specifically, as aforementioned, when an attempt is made to send the channel characteristic itself, for example, in a case of 8×4 MIMO, even if one channel characteristic is quantized by 13 bits (6 bits for amplitude and 7 bits for phase), the size of feedback information reaches 8×4×13=416 bits. Further, in consideration of a fact that the feedback of the information about the transmit antenna weight is necessarily requested anyway, the amount of the information about the transmit antenna weight (4 bits for the PMI) is added, and the size of the feedback information thereby becomes 416+4=420 bits as a total. On the other hand, in the feedback method according to this embodiment, for example, in a case of 8×4 MIMO, the information about one receive antenna weight is quantized by 13 bits, as one example. Then, even taking into consideration the amount of the information about the transmit antenna weight (4 bits for each PMI), the size of the feedback information requests (13+4)×4=68 bits as a total.

Further, a discussion will also be made about, for example, a case where 8×4 MIMO is performed by the TDD scheme and only one of four antennas in the wireless terminal 20 is usable as the transmit antenna, for example. In this case, in a case where an attempt is made to send the channel characteristic itself, 8×3×13+4=316 bits as a total are requested. On the other hand, the feedback method according to this embodiment requests (13+4)×3=51 bits as a total.

Note that it is considered that the difference between the sizes of the feedback information based on the two methods becomes greater as the numbers of the transmit antennas and the receive antennas increase. In such a manner, this embodiment does not have a problem in the aforementioned third viewpoint because the size of the feedback information amount is sufficiently small.

In the first embodiment described above, in a case where the downlink multipath communication is performed, the wireless terminal 20 feeds back the information about the transmit antenna weight and the information about the receive antenna weight to the wireless base station 10. Consequently, the wireless base station 10 is enabled to estimate the channel characteristic in the downlink multipath communication based on the information about the transmit antenna weight and the information about the receive antenna weight that are fed back. Further, the feedback method according to the first embodiment has advantages of small changes to the prearranged specification and of the small size of the feedback information. Accordingly, the first embodiment enables realization of the feedback method that includes an improvement in functions and easiness of introduction.

[Second Embodiment]

A second embodiment will hereinafter be described based on FIG. 3. The second embodiment is correspondent to a case where the invention of this application is specifically applied to a wireless communication system based on LTE. However, it is noted that the invention of this application is not limited to LTE but is similarly applicable to a wireless communication system based on another wireless communication protocol.

The second embodiment is applicable to either one of the FDD and the TDD in LTE but is particularly preferable for the FDD.

FIG. 3 is a diagram that illustrates a process sequence of the wireless communication system according to the second embodiment. Note that FIG. 3 illustrates the process sequence in a case where the wireless base station 10 has four transmit antennas and the wireless terminal 20 has two receive antennas. However, it goes without saying that those values are only examples.

In S101 in FIG. 3, the wireless terminal 20 transmits antenna configuration information to the wireless base station 10. Here, the antenna configuration information is information in which the wireless terminal 20 itself respectively indicates the number of receive antennas (that is, the antennas used by the wireless terminal 20 for downlink wireless communication). The antenna configuration information in FIG. 3 is information that indicates that the number of receive antennas is two, as one example. The antenna configuration information is transmitted in a case where, for example, the wireless terminal 20 is connected with the wireless base station 10 (in a case of transition to RRC_CONNECTED state). However, the antenna configuration information may be transmitted further at regular timings or in occurrence of a prescribed event. The antenna configuration information may be transmitted by using an uplink radio resource control (RRC) signal, for example.

In S102 in FIG. 3, the wireless base station 10 transmits a CSI report mode to the wireless terminal 20. The CSI report mode is information that indicates whether the mode (type) in a report of CSI is a first mode or a second mode. Here, the first mode is correspondent to a CSI report method of an ordinary type in LTE (usual report method), in which the wireless terminal 20 transmits the rank in the downlink multipath communication and the PMI which corresponds to the rank. Meanwhile, the second mode is correspondent to a CSI report method that is particular to the embodiment of this application, in which the rank is fixed to 1 and the PMI and the information about the receive antenna weight are reported for each of the receive antennas. The CSI report mode is transmitted in a case where, for example, the wireless terminal 20 is connected with the wireless base station 10. However, the CSI report mode may be transmitted further at regular timings or in occurrence of a prescribed event. The antenna configuration information may be transmitted by using a downlink RRC signal, for example.

In S102 in FIG. 3, for example, it is assumed that the wireless base station 10 transmits, to the wireless terminal 20, the CSI report mode in which the second mode is designated.

In S103 in FIG. 3, the wireless base station 10 transmits a channel state information reference signal (CSI-RS) to the wireless terminal 20. The CSI-RS is a prearranged reference signal for the wireless terminal 20 to decide the CSI and is transmitted in a different pattern such that the transmit antennas do not interfere with each other. The CSI-RS is transmitted at regular timings in a prescribed period that is comparatively short.

In S104 in FIG. 3, the wireless terminal 20 decides (calculates) the CSI based on the CSI-RS received in S103. In FIG. 3, because the second mode is designated in S102, the rank is fixed to 1 here, and the PMI and the information about the receive antenna weight (referred to as receive antenna weight information) are decided for each of the receive antennas. More specifically, based on the CSI-RS received in S103, the 4×1 multipath channel characteristic in a case where the rank is 1 is estimated for a first terminal antenna between two receive antennas, and the PMI and the receive antenna weight information for the first terminal antenna are decided based on the concerned channel characteristic. Further, based on the same CSI-RS as the above, the 4×1 multipath channel characteristic in a case where the rank is 1 is estimated for a second terminal antenna between the two receive antennas, and the PMI and the receive antenna weight information for the second terminal antenna are decided based on the concerned channel characteristic.

Note that here, as the receive antenna weight information, the amplitude and phase of the receive antenna weight (vector) may be used, for example. In this case, it is desirable that the amplitude and phase be appropriately quantized.

In S105 in FIG. 3, the wireless terminal 20 feeds back (reports) the PMI and the receive antenna weight information for the first terminal antenna to the wireless base station 10. The PMI and the receive antenna weight information are transmitted periodically via a physical uplink control channel (PUCCH) or aperiodically via a physical uplink shared channel (PUSCH).

In S106 in FIG. 3, the wireless base station 10 estimates the channel characteristic (4×1) in the downlink multipath for the first terminal antenna based on the PMI and the receive antenna weight information for the first terminal antenna, which is received in S105. This estimation may be performed similarly to the first embodiment, and a detailed description will thus not be made.

In S107 in FIG. 3, the wireless terminal 20 transmits (reports) the PMI and the receive antenna weight information for the second terminal antenna to the wireless base station 10. Further, in S108, the wireless base station 10 estimates the channel characteristic (4×1) in the downlink multipath for the second receive antenna based on the PMI and the receive antenna weight information for the second terminal antenna, which is received in S107. Those may be performed similarly to S105 and S106, and a description will thus not be made.

In S109 in FIG. 3, the wireless base station 10 decides the ranks and the transmit antenna weights (precoding matrices) for all the terminal antennas. In S106 and S108, the wireless base station 10 estimates the channel characteristics (4×1) in the downlink multipath for each of the first terminal antenna and the second terminal antenna. Consequently, the wireless base station 10 may recognize the channel characteristics (4×2) in the downlink multipath for all the terminal antennas. In other words, the wireless base station 10 may recognize the channel characteristics (4×2) in the whole downlink multipath. As a result, the wireless base station 10 may freely decide the ranks based on the channel characteristics (4×2) in this whole downlink multipath and may decide (calculate) by itself the transmit antenna weights that correspond to the decided ranks.

In S110 in FIG. 3, the wireless base station 10 transmits downlink data and downlink control information to the wireless terminal 20 by the downlink multipath communication based on the ranks and the transmit antenna weights that are decided in S109. Here, the downlink data are transmitted via a physical downlink shared channel (PDSCH). Further, the downlink control information in LTE is referred to as DCI and is transmitted along with the downlink data via a physical downlink control channel (PDCCH). The rank and the transmit antenna weight that are decided by the wireless base station 10 in S109 are stored in a prescribed region in the DCI and are notified to the wireless terminal 20. The notification of the rank and the transmit antenna weight here may be performed by making use of the prearranged RI or PMI.

In S111, the wireless terminal 20 demodulates the downlink data received in S110 based on the downlink control information received in S110.

The second embodiment described earlier provides similar effects to the first embodiment by similar work to the first embodiment.

[Third Embodiment]

A third embodiment will hereinafter be described based on FIG. 4. The third embodiment is correspondent to a modification example of the second embodiment and correspondent to a case where the invention of this application is specifically applied to a wireless communication system based on LTE. However, it is noted that the invention of this application is not limited to LTE but is similarly applicable to a wireless communication system based on another wireless communication protocol.

It is noted that the third embodiment is applicable to the TDD of LTE but is not applicable to the FDD of LTE.

Figure 4:
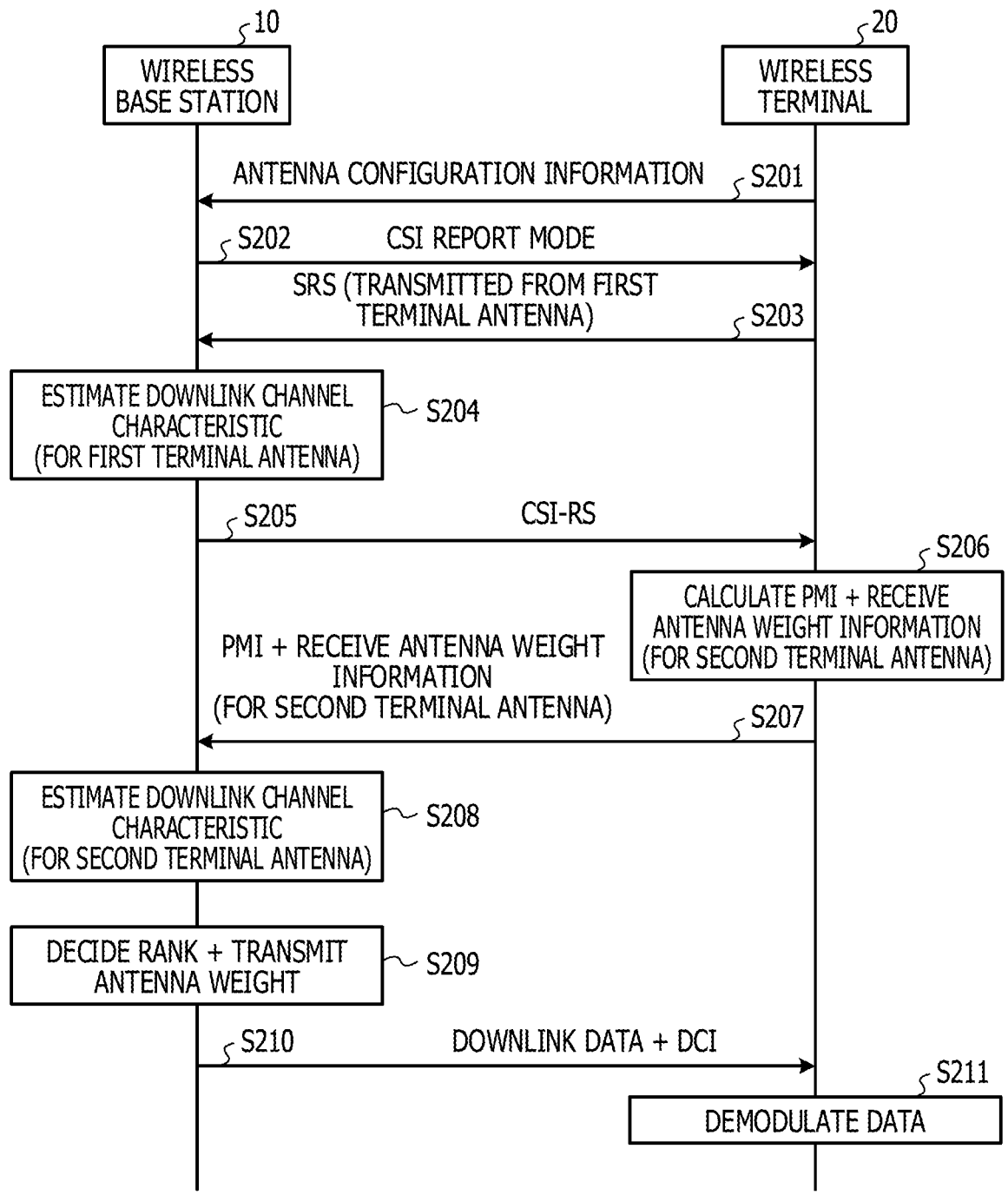
FIG. 4 is a diagram that illustrates a process sequence of the wireless communication system according to a third embodiment.

FIG. 4 is a diagram that illustrates a process sequence of the wireless communication system according to the third embodiment. Note that FIG. 3 illustrates the process sequence in a case where the wireless base station 10 has four transmit antennas, the wireless terminal 20 has two receive antennas, and the wireless terminal 20 has one transmit antenna. However, it goes without saying that those values are only examples.

The process of the third embodiment illustrated in FIG. 4 has many common points to the process of the second embodiment illustrated in FIG. 3. Thus, here, a description will mainly be made about portions in FIG. 4 that are different from FIG. 3.

In S201 in FIG. 4, the wireless terminal 20 transmits the antenna configuration information to the wireless base station 10. Here, antenna configuration information of the third embodiment includes the number of transmit antennas of the wireless terminal 20 (that is, the antennas used by the wireless terminal 20 for uplink wireless communication) in addition to the number of receive antennas of the wireless terminal 20. The antenna configuration information in FIG. 4 is information that indicates that the number of receive antennas is two and one transmit antenna is provided, as one example.

S202 in FIG. 4 may be performed similarly to S102 in FIG. 3.

In S203 in FIG. 4, the wireless terminal 20 transmits a sounding reference signal (SRS) from the transmit antenna to the wireless base station 10. The SRS is an uplink reference signal that is used by the wireless base station 10 for measuring or estimating the uplink channel quality or channel characteristic. The SRS is transmitted from the antenna that may be used as the transmit antenna among the antennas included in the wireless terminal 20. In the example in FIG. 4, the SRS is transmitted from one antenna (assumed as the first terminal antenna) that may be used as the transmit antenna between the two antennas included in the wireless terminal 20. Note that if there are plural transmit antennas in the wireless terminal 20, it goes without saying that transmission of the SRS is performed from those plural transmit antennas.

In S204 in FIG. 4, the wireless base station 10 estimates the channel characteristic (4×1) in the downlink multipath for the first terminal antenna based on the SRS received in S203. Because the third embodiment has the TDD as a premise, the uplink channel characteristic is equivalent to the downlink channel characteristic. Thus, the wireless base station 10 may estimate the downlink channel characteristic based on the SRS that is the uplink reference signal. Note that if there are plural transmit antennas in the wireless terminal 20, it goes without saying that estimation in S204 is performed for each of those plural transmit antennas.

S205 in FIG. 4 may be performed similarly to S103 in FIG. 3.

S206 in FIG. 4 may be performed similarly to S104 in FIG. 3. However, it is noted that the calculation of the PMI and the receive antenna weight information in S206 may be performed only for the second terminal antenna. This is because as for the first terminal antenna, the wireless base station 10 already obtains the downlink channel characteristic in S204 and the feedback of the PMI or the receive antenna weight information is not requested. Of course, if there are plural antennas that may not be used as the transmit antennas in the wireless terminal 20, it goes without saying that estimation in S206 is performed for each of those plural transmit antennas.

S207 to S211 in FIG. 4 may be performed similarly to S107 to S111 in FIG. 3, and a description will thus not be made.

The third embodiment described earlier provides similar effects to the first embodiment by similar work to the first embodiment. In addition, the third embodiment utilizes the uplink reference signal and thereby provides an effect of reducing the size of the feedback information from the wireless terminal 20 to the wireless base station 10.

[Network Configuration of Wireless Communication System in Embodiments]

Figure 5:
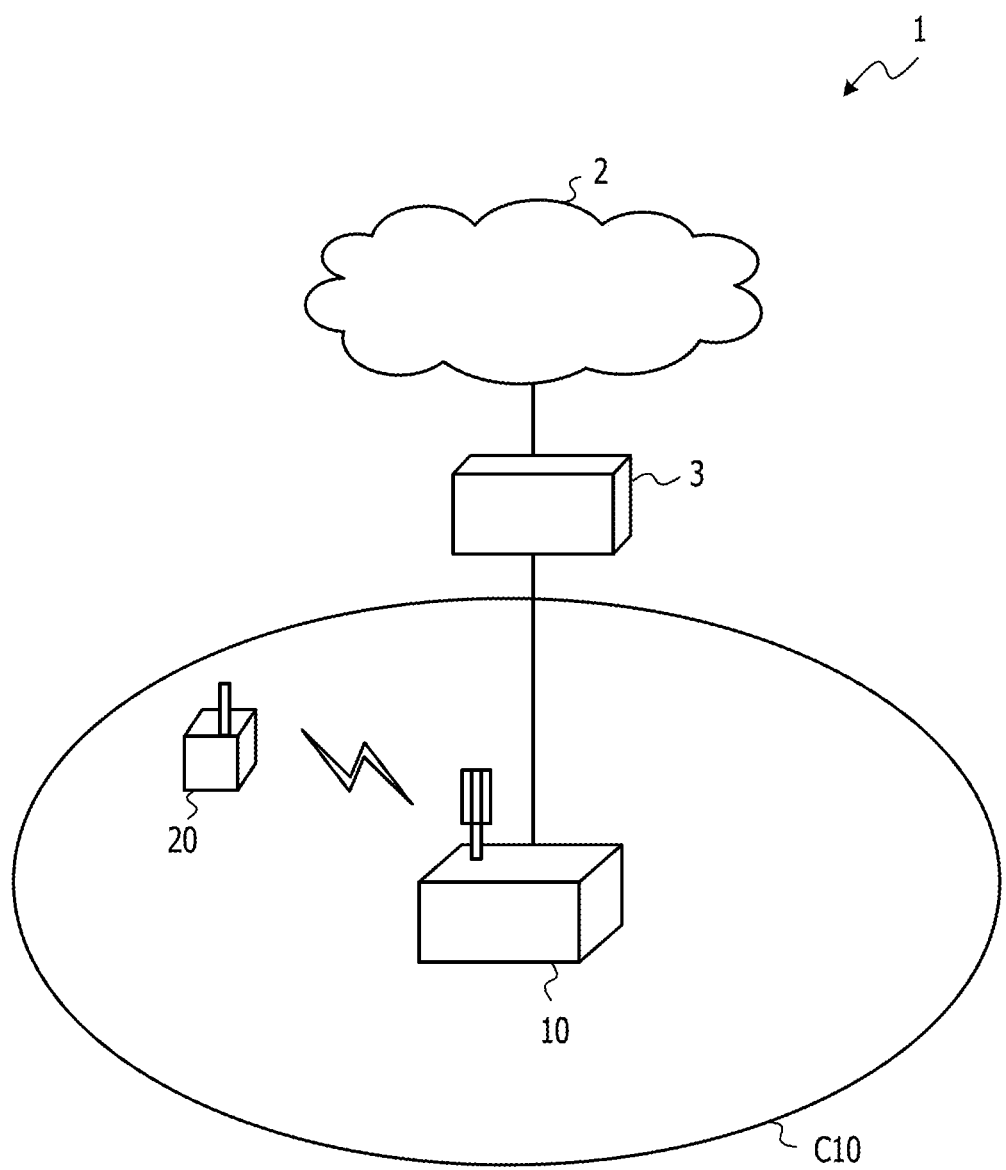
FIG. 5 is a diagram that illustrates one example of a network configuration of the wireless communication system in the embodiments.

Next, a description will be made about a network configuration of a wireless communication system 1 of the embodiments based on FIG. 5. As illustrated in FIG. 5, the wireless communication system 1 has the wireless base station 10 and the wireless terminal 20. The wireless base station 10 forms a cell C10. The wireless terminal 20 exists in the cell C10. It will be noticed that the wireless base station 10 may be referred to as "transmission station" and the wireless terminal 20 may be referred to as "reception station" in this application.

The wireless base station 10 is connected with a network device 3 via wired connection, and the network device 3 is connected with a network 2 via wired connection. The wireless base station 10 is provided to be capable of transmitting and receiving data and control information with respect to another wireless base station via the network device 3 and the network 2.

In the wireless base station 10, a wireless communication function with the wireless terminal 20 and digital signal processing and control functions may be separated and may be made separate devices. In this case, the device that includes the wireless communication function will be referred to as a remote radio head (RRH), and the device that includes the digital signal processing and control functions will be referred to as a base band unit (BBU). The RRH may be placed to be projected from the BBU, and the wired connection may be made between those by an optical fiber or the like. Further, the wireless base station 10 may be a macro wireless base station, a small type wireless base station such as a pico wireless base station (including a micro wireless base station, a femto wireless base station, and so forth), or a wireless base station of various scales. Further, in a case where a relay station is used which relays wireless communication between the wireless base station 10 and the wireless terminal 20, the concerned relay station (transmission and reception with respect to the wireless terminal 20 and the control thereof) may also be included in the wireless base station 10 of this application.

Meanwhile, the wireless terminal 20 performs communication with the wireless base station 10 by wireless communication.

The wireless terminal 20 may be a wireless terminal such as a cellular phone, a smartphone, a personal digital assistant (PDA), a personal computer, or various kinds of devices or apparatuses (sensor devices and so forth) that have a wireless communication function. Further, in a case where the relay station is used which relays wireless communication between the wireless base station 10 and the wireless terminal, the concerned relay station (transmission and reception with respect to the wireless base station 10 and the control thereof) may also be included in the wireless terminal 20 of this document.

The network device 3 includes a communication unit and a control unit, for example. Those configuration portions are connected such that inputs and outputs of signals and data are possible unidirectionally or bidirectionally. The network device 3 is realized with a gateway, for example. As a hardware configuration of the network device 3, for example, the communication unit is realized with an interface circuit, and the control unit is realized with a processor and a memory.

Note that specific modes of distribution and integration of configuration elements of the wireless base station and the wireless terminal are not limited to the mode in the first embodiment. All or a portion of the configuration elements may be configured by functionally or physically distributing or integrating the configuration elements by arbitrary units in accordance with various kinds of loads, use situations, and so forth. For example, the memory may be connected as an external device of the wireless base station or the wireless terminal via a network or a cable.

[Function Configurations of Devices in Wireless Communication System in Embodiments]

Next, a description will be made about function configurations of devices in the wireless communication system in the embodiments based on FIG. 6 and FIG. 7.

Figure 6:
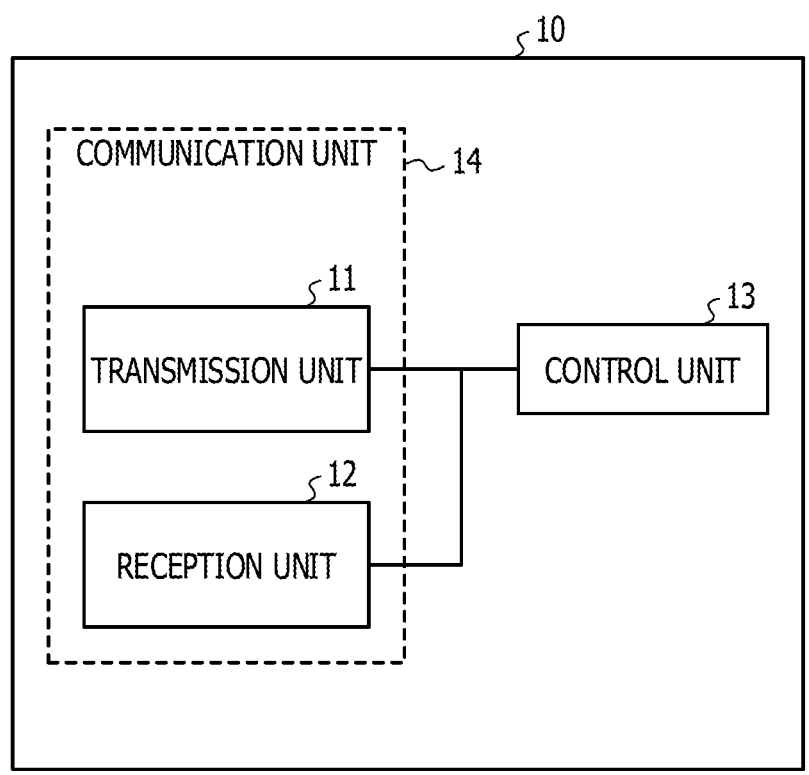
FIG. 6 is one example of a function configuration diagram of a wireless base station in the wireless communication system in the embodiments.

FIG. 6 is a function block diagram that illustrates a configuration of the wireless base station 10. As illustrated in FIG. 6, the wireless base station 10 includes a transmission unit 11, a reception unit 12, and a control unit 13. Those configuration portions are connected such that inputs and outputs of signals and data are possible unidirectionally or bidirectionally. Note that the transmission unit 11 and the reception unit 12 are collectively referred to as a communication unit 14.

The transmission unit 11 transmits a data signal or a control signal by wireless communication via the antenna. Note that the antenna may be commonly used for transmission and reception. The transmission unit 11 transmits a downlink signal via a downlink data channel or control channel, for example. The downlink data channel includes the physical downlink shared channel (PDSCH), for example. Further, the downlink control channel includes the physical downlink control channel (PDCCH), for example. The signal to be transmitted includes an L1L2 control signal that is transmitted on the control channel to the wireless terminal 20 in a connected state, a user data signal that is transmitted on the data channel to the wireless terminal 20 in a connected state, or a radio resource control (RRC) control signal, for example. Further, the signal to be transmitted includes a reference signal that is used for channel estimation or demodulation, for example.

As a specific example of the signal transmitted by the transmission unit 11, each signal transmitted by the wireless base station 10 which is illustrated in FIGS. 1 to 4 is raised. The signal transmitted by the transmission unit 11 is not limited to those but includes any signal that is transmitted by the wireless base station 10 in the above embodiments and modification example.

The reception unit 12 receives a data signal or a control signal that is transmitted from the wireless terminal 20 by first wireless communication via the antenna. The reception unit 12 receives an uplink signal via an uplink data channel or control channel, for example. The uplink data channel includes the physical uplink shared channel (PUSCH), for example. Further, the uplink control channel includes the physical uplink control channel (PUCCH), for example. The signal to be received includes the L1L2 control signal that is transmitted on the control channel from the wireless terminal 20 in a connected state, the user data signal that is transmitted on the data channel from the wireless terminal 20 in a connected state, or the radio resource control (RRC) control signal, for example. Further, the signal to be received includes the reference signal that is used for channel estimation or demodulation, for example.

As a specific example of the signal received by the reception unit 12, each signal received by the wireless base station 10 which is illustrated in FIGS. 1 to 4 is raised. The signal received by the reception unit 12 is not limited to those but includes any signal that is received by the wireless base station 10 in the above embodiments and modification example.

The control unit 13 outputs data or control information, which is transmitted, to the transmission unit 11. The control unit 13 inputs data or control information, which is received, from the reception unit 12. The control unit 13 acquires data or control information from the network device 3 or another wireless base station via wired connection or wireless connection. Other than those, the control unit performs a variety of control related to various kinds of transmission signals transmitted by the transmission unit 11 and various kinds of reception signals received by the reception unit 12.

As a specific example of a process controlled by the control unit 13, each process executed by the wireless base station 10 which is illustrated in FIGS. 1 to 4 is raised. The process controlled by the control unit 13 is not limited to those but includes any process that is executed by the wireless base station 10 in the above embodiments and modification example.

Figure 7:
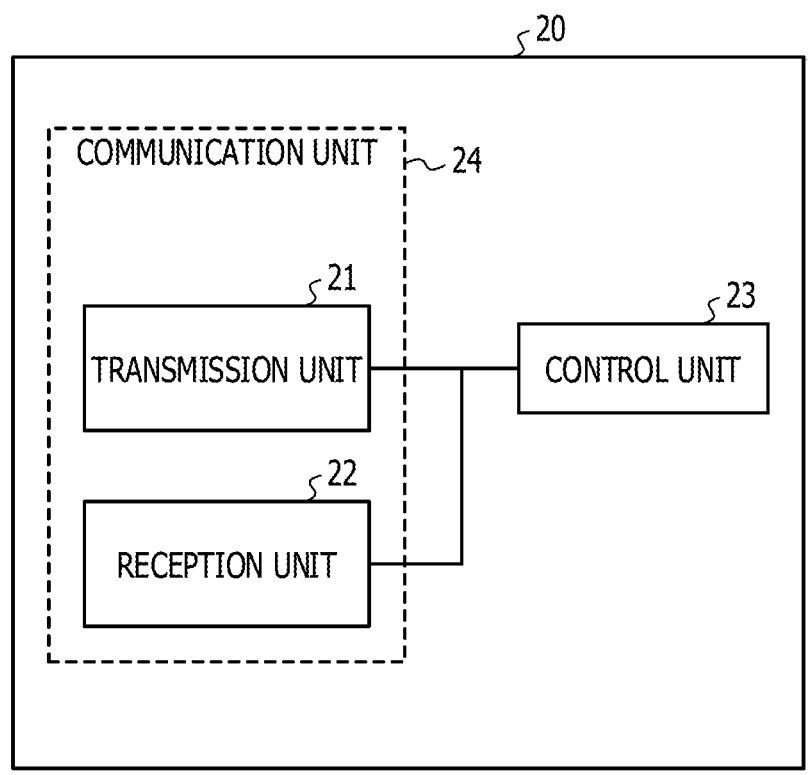
FIG. 7 is one example of a function configuration diagram of a cellular phone wireless terminal in the wireless communication system in the embodiments.

FIG. 7 is a function block diagram that illustrates a configuration of the wireless terminal 20. As illustrated in FIG. 7, the wireless terminal 20 includes a transmission unit 21, a reception unit 22, and a control unit 23. Those configuration portions are connected such that inputs and outputs of signals and data are possible unidirectionally or bidirectionally. Note that the transmission unit 21 and the reception unit 22 are collectively referred to as a communication unit 24.

The transmission unit 21 transmits a data signal or a control signal by wireless communication via the antenna. Note that the antenna may be commonly used for transmission and reception. The transmission unit 21 transmits an uplink signal via the uplink data channel or control channel, for example. The uplink data channel includes the physical uplink shared channel (PUSCH), for example. Further, the uplink control channel includes the physical uplink control channel (PUCCH), for example. The signal to be transmitted includes the L1L2 control signal that is transmitted on the control channel to the connected wireless base station 10, the user data signal that is transmitted on the data channel to the connected wireless base station 10, or the radio resource control (RRC) control signal, for example. Further, the signal to be transmitted includes the reference signal that is used for channel estimation or demodulation, for example.

As a specific example of the signal transmitted by the transmission unit 21, each signal transmitted by the wireless terminal 20 which is illustrated in FIGS. 1 to 4 is raised. The signal transmitted by the transmission unit 21 is not limited to those but includes any signal that is transmitted by the wireless terminal 20 in the above embodiments and modification example.

The reception unit 22 receives a data signal or a control signal that is transmitted from the wireless base station 10 by wireless communication via the antenna. The reception unit 22 receives a downlink signal via the downlink data channel or control channel, for example. The downlink data channel includes the physical downlink shared channel (PDSCH), for example. Further, the downlink control channel includes the physical downlink control channel (PDCCH), for example. The signal to be received includes the L1L2 control signal that is transmitted on the control channel from the connected wireless base station 10, the user data signal that is transmitted on the data channel from the connected wireless base station 10, or the radio resource control (RRC) control signal, for example. Further, the signal to be received includes the reference signal that is used for channel estimation or demodulation, for example.

As a specific example of the signal received by the reception unit 22, each signal received by the wireless terminal 20 which is illustrated in FIGS. 1 to 4 is raised. The signal received by the reception unit 22 is not limited to those but includes any signal that is received by the wireless terminal 20 in the above embodiments and modification example.

The control unit 23 outputs data or control information, which is transmitted, to the transmission unit 21. The control unit 23 inputs data or control information, which is received, from the reception unit 22. The control unit 23 acquires data or control information from the network device 3 or another wireless base station via wired connection or wireless connection. Other than those, the control unit performs a variety of control related to various kinds of transmission signals transmitted by the transmission unit 21 and various kinds of reception signals received by the reception unit 22.

As a specific example of a process controlled by the control unit 23, each process executed by the wireless terminal 20 which is illustrated in FIGS. 1 to 4 is raised. The process controlled by the control unit 23 is not limited to those but includes any process that is executed by the wireless terminal 20 in the above embodiments and modification example.

[Hardware Configurations of Devices in Wireless Communication System in Embodiments]

Next, a description will be made about hardware configurations of devices in the wireless communication system in the embodiments and modification examples based on FIG. 8 and FIG. 9.

Figure 8:
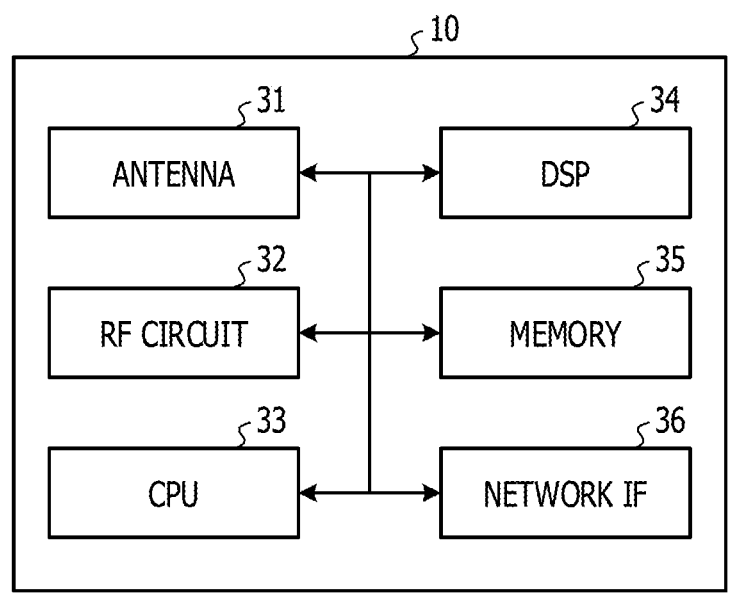
FIG. 8 is one example of a hardware configuration diagram of a wireless base station in the wireless communication system in the embodiments.

FIG. 8 is a diagram that illustrates a hardware configuration of the wireless base station 10. As illustrated in FIG. 8, the wireless base station 10 has a radio frequency (RF) circuit 32 that includes an antenna 31, a central processing unit (CPU) 33, a digital signal processor (DSP) 34, a memory 35, and a network interface (IF) 36 as hardware configuration elements, for example. The CPU is connected such that inputs and outputs of various kinds of signals and data are possible via a bus. The memory 35 includes at least any of a random access memory (RAM) such as a synchronous dynamic random access memory (SDRAM), a read only memory (ROM), and a flash memory, for example, and stores programs, control information, and data.

A description will be made about the correspondence between the function configuration of the wireless base station 10, which is illustrated in FIG. 6, and the hardware configuration of the wireless base station 10, which is illustrated in FIG. 8. The transmission unit 11 and the reception unit 12 (or the communication unit 14) is realized by the RF circuit 32 or the antenna 31 and the RF circuit 32, for example. The control unit 21 is realized by the CPU 33, the DSP 34, the memory 35, a digital electronic circuit that is not illustrated, and so forth, for example. For example, as the digital electronic circuit, an application specific integrated circuit (ASIC), a field-programming gate array (FPGA), a large scale integration (LSI), or the like is raised, for example.

Figure 9:
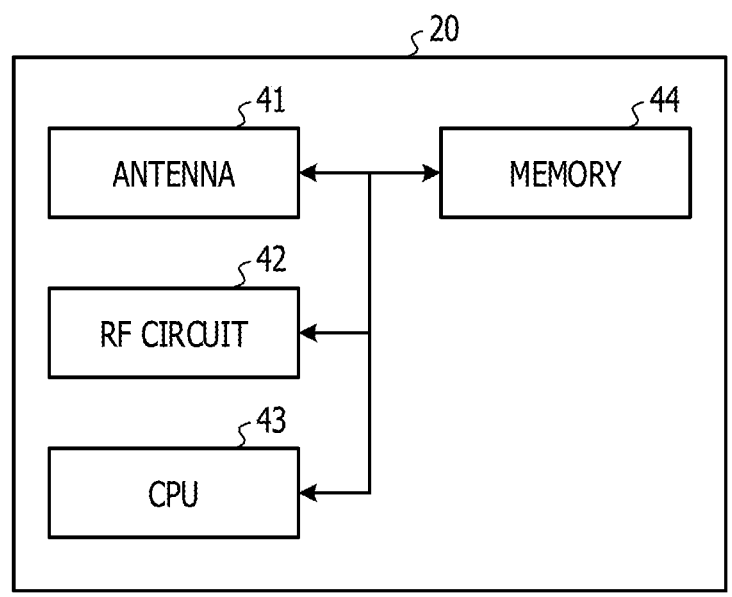
FIG. 9 is one example of a hardware configuration diagram of the cellular phone wireless terminal in the wireless communication system in the embodiments.

FIG. 9 is a diagram that illustrates a hardware configuration of the wireless terminal 20. As illustrated in FIG. 9, the wireless terminal 20 has an RF circuit 42 that includes an antenna 41, a CPU 43, and a memory 44 as hardware configuration elements, for example. In addition, the wireless terminal 20 may have a display device such as a liquid crystal display (LCD) that is connected with the CPU 43. The memory 44 includes at least any of a RAM such as a SDRAM, a ROM, and a flash memory, for example, and stores programs, control information, and data.

A description will be made about the correspondence between the function configuration of the wireless terminal 20, which is illustrated in FIG. 7, and the hardware configuration of the wireless terminal 20, which is illustrated in FIG. 9. The transmission unit 21 and the reception unit 22 (or the communication unit 24) is realized by the RF circuit 42 or the antenna 41 and the RF circuit 42, for example. The control unit 23 is realized by the CPU 43, the memory 44, a digital electronic circuit that is not illustrated, and so forth, for example. For example, as the digital electronic circuit, an ASIC, an FPGA, an LSI, or the like is raised, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for controlling wireless communication in a wireless communication system that has a transmission device and a reception device, the transmission device including plural transmit antennas, the reception device including plural receive antennas, the method comprising:

executing, by the reception device, a first reception process that includes receiving a reference signal through only a first specific receive antenna which is an antenna selected from among the plural receive antennas, the reference signal being transmitted from each of the plural transmit antennas;

executing, by the reception device, a first decision process that includes deciding a first transmit antenna weight and a first receive antenna weight based on the reference signal received through only the first specific receive antenna, the first transmit antenna weight and the first receive antenna weight being applied in a case where only the first specific receive antenna receives a signal which is transmitted by each of the plural transmit antennas based on same transmission data;

executing, by the reception device, a first transmission process that includes transmitting first information about the first transmit antenna weight and second information about the first receive antenna weight to the transmission device; and executing, by the reception device, a second reception process that includes receiving the reference signal through only a second specific receive antenna which is different from the first specific receive antenna and is an antenna selected from among the plural receive antennas;

executing, by the reception device, a second decision process that includes deciding a second transmit antenna weight and a second receive antenna weight based on the reference signal received through only the second specific receive antenna, the second transmit antenna weight and the second receive antenna weight being applied in a case where only the second specific receive antenna receives a signal which is transmitted by each of the plural transmit antennas based on same transmission data;

executing, by the reception device, a second transmission process that includes transmitting third information about the second transmit antenna weight and fourth information about the second receive antenna weight to the transmission device; and executing, by the transmission device, an estimation process that includes estimating a communication path characteristic between the plural transmit antennas and the plural reception antennas in accordance with the first transmit antenna weight indicated by the first information, the first receive antenna weight indicated by the second information, the second transmit antenna weight indicated by the third information, and the second receive antenna weight indicated by the fourth information.

2. The method according to claim 1, the method further comprising:

executing, by the transmission device, a second decision process that includes deciding the specific transmit antenna weight and the specific receive antenna by setting each of the at least one receive antenna as the specific receive antenna.

3. The method according to claim 1, the method further comprising:
executing, by the transmission device, a third decision process that includes deciding the transmit antenna weight and the receive antenna weight by setting, as the specific receive antenna, each receive antenna that is not used as the transmit antenna among the at least one receive antenna.

4. A wireless communication system for controlling wireless communication, the system comprising:
a transmission device which includes plural transmit antennas; and
a reception device which includes plural receive antennas, wherein the reception device is configured to
execute a first reception process that includes receiving a reference signal through only a first specific receive antenna which is an antenna selected from among the plural receive antennas, the reference signal being transmitted from each of the plural transmit antennas,
execute a first decision process that includes deciding a first transmit antenna weight and a first receive antenna weight based on the reference signal received through only the first specific receive antenna, the first transmit antenna weight and the first receive antenna weight being applied in a case where only the first specific receive antenna receives a signal which is transmitted by each of the plural transmit antennas based on same transmission data,
execute a first transmission process that includes transmitting first information about the first transmit antenna weight and second information about the first receive antenna weight to the transmission device,
execute a second reception process that includes receiving the reference signal through only a second specific receive antenna which is different from the first specific receive antenna and is an antenna selected from among the plural receive antennas,
execute a second decision process that includes deciding a second transmit antenna weight and a second receive antenna weight based on the reference signal received through only the second specific receive antenna, the second transmit antenna weight and the second receive antenna weight being applied in a case where only the second specific receive antenna receives a signal which is transmitted by each of the plural transmit antennas based on same transmission data, and
execute a second transmission process that includes transmitting third information about the second transmit antenna weight and fourth information about the second receive antenna weight to the transmission device, and
wherein the transmission device is configured to
execute an estimation process that includes estimating a communication path characteristic between the plural transmit antennas and the plural reception antennas in accordance with the first transmit antenna weight indicated by the first information, the first receive antenna weight indicated by the second information, the second transmit antenna weight indicated by the third information, and the second receive antenna weight indicated by the fourth information.

5. The system according to claim 4, wherein
the transmission device is configured to
execute a second decision process that includes deciding the specific transmit antenna weight and the specific receive antenna by setting each of the at least one receive antenna as the specific receive antenna.

6. The system according to claim 4, wherein
the transmission device is configured to
execute a third decision process that includes deciding the transmit antenna weight and the receive antenna weight by setting, as the specific receive antenna, each receive antenna that is not used as the transmit antenna among the at least one receive antenna.

7. A reception device for performing wireless communication with a transmission device that includes plural transmit antennas, the reception device comprising:
plural receive antennas; and
a control circuit coupled to the receive antenna and configured to
execute a first reception process that includes receiving a reference signal through only a first specific receive antenna which is an antenna selected from among the plural receive antennas, the reference signal being transmitted from each of the plural transmit antennas,
execute a first decision process that includes deciding a first transmit antenna weight and a first receive antenna weight based on the reference signal received through only the first specific receive antenna, the first transmit antenna weight and the first receive antenna weight being applied in a case where only the first specific receive antenna receives a signal which is transmitted by each of the plural transmit antennas based on same transmission data,
execute a first transmission process that includes transmitting first information about the first transmit antenna weight and second information about the first receive antenna weight to the transmission device,
execute a second reception process that includes receiving the reference signal through only a second specific receive antenna which is different from the first specific receive antenna and is an antenna selected from among the plural receive antennas,
execute a second decision process that includes deciding a second transmit antenna weight and a second receive antenna weight based on the reference signal received through only the second specific receive antenna, the second transmit antenna weight and the second receive antenna weight being applied in a case where only the second specific receive antenna receives a signal which is transmitted by each of the plural transmit antennas based on same transmission data, and
execute a second transmission process that includes transmitting third information about the second transmit antenna weight and fourth information about the second receive antenna weight to the transmission device, and
wherein a set of parameters including the first information, the second information, the third information, and the fourth information is configured to cause the transmission device to estimate a communication path characteristic between the plural transmit antennas and the plural reception antenna in accordance with the first transmit antenna weight indicated by the first information, the first receive antenna weight indicated by the second information, the second transmit antenna weight indicated by the third information, and the second receive antenna weight indicated by the fourth information.

8. The reception device according to claim 7, wherein the specific transmit antenna weight is decided by setting each of the at least one receive antenna as the specific receive antenna.

9. The reception device according to claim 7, wherein the transmit antenna weight and the receive antenna weight are decided by setting, as the specific receive antenna, each receive antenna that is not used as the transmit antenna among the at least one receive antenna.

10. A transmission device for performing wireless communication with a reception device that includes plural receive antennas, the transmission device comprising:
    plural transmit antennas; and
    a control circuit coupled to the plural transmit antennas and configured to
        execute a transmission process that includes transmitting a reference signal from each of the plural transmit antennas, and
        execute a reception process that includes receiving, from the reception device, first information about a first transmit antenna weight, second information about a first receive antenna weight, third information about a second transmit antenna weight, and fourth information about a second receive antenna weight,
    wherein the reference signal transmitted by the transmission process causes a processor included in the reception device to perform processing, the processing including:
        executing a first reception process that includes receiving the reference signal through only a first specific receive antenna which is an antenna selected from among the plural receive antennas,
        executing a first decision process that includes deciding a first transmit antenna weight and a first receive antenna weight based on the reference signal received through only the first specific receive antenna, the first transmit antenna weight and the first receive antenna weight being applied in a case where only the first specific receive antenna receives a signal which is transmitted by each of the plural transmit antennas based on same transmission data,
        executing a first transmission process that includes transmitting first information about the first transmit antenna weight and second information about the first receive antenna weight to the transmission device,
        executing a second reception process that includes receiving the reference signal through only a second specific receive antenna which is different from the first specific receive antenna and is an antenna selected from among the plural receive antennas,
        executing a second decision process that includes deciding a second transmit antenna weight and a second receive antenna weight based on the reference signal received through only the second specific receive antenna, the second transmit antenna weight and the second receive antenna weight being applied in a case where only the second specific receive antenna receives a signal which is transmitted by each of the plural transmit antennas based on same transmission data, and
        executing a second transmission process that includes transmitting third information about the second transmit antenna weight and fourth information about the second receive antenna weight to the transmission device, and
    the control circuit is configured to
        execute an estimation process that includes estimating a communication path characteristic between the plural transmit antennas and the plural reception antennas in accordance with the first transmit antenna weight indicated by the first information, the first receive antenna weight indicated by the second information, the second transmit antenna weight indicated by the third information, and the second receive antenna weight indicated by the fourth information.

11. The transmission device according to claim 10, wherein
    the control circuit is configured to
    execute a second decision process that includes deciding the specific transmit antenna weight and the specific receive antenna by setting each of the at least one receive antenna as the specific receive antenna.

12. The transmission device according to claim 10, wherein
    the control circuit is configured to execute a third decision process that includes deciding the transmit antenna weight and the receive antenna weight by setting, as the specific receive antenna, each receive antenna that is not used as the transmit antenna among the at least one receive antenna.

* * * * *